UNITED STATES PATENT OFFICE.

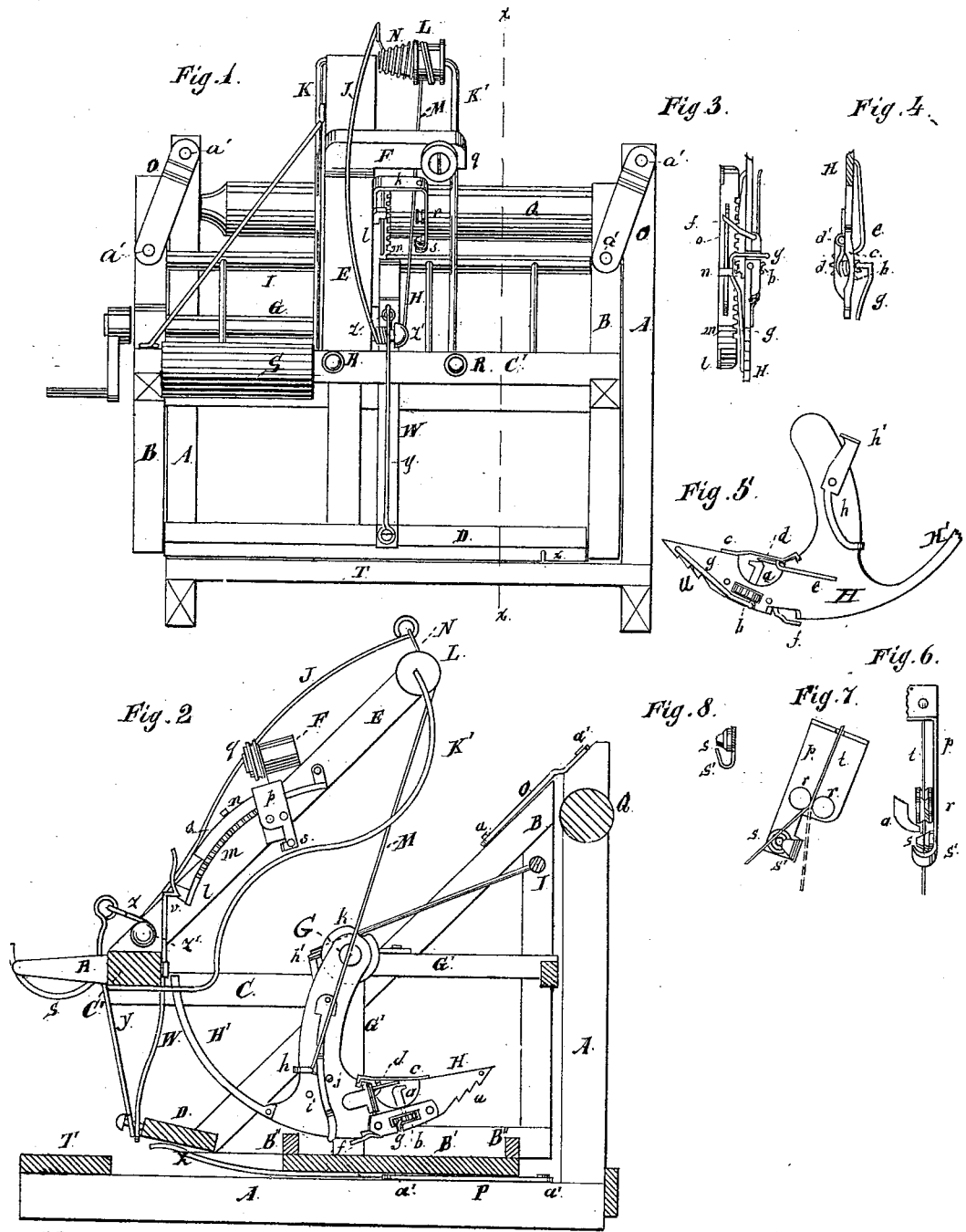

JOHN F. STEWARD, OF PLANO, ILLINOIS.

GRAIN-BINDER.

SPECIFICATION forming part of Letters Patent No. 266,733, dated October 31, 1882.

Application filed April 12, 1876.

*To all whom it may concern:*

Be it known that I, JOHN F. STEWARD, of Plano, Kendall county, State of Illinois, have invented new and useful Improvements in Grain-Binders for Harvesters, of which the following is a full description, reference being had to the accompanying drawings, in which—

Figure 1 is a side view; Fig. 2, a cross-section on line *x x* of Fig. 1; Fig. 3, a detail of the binder-arm and twisting mechanism in position for operating; Fig. 4, a detail showing the inner face of the binder-arm; Fig. 5, a rear view of the binder-arm and head; Figs. 6, 7, and 8, details of the binding-wire guide.

This invention relates to certain improvements in automatic binding attachments for harvesting-machines.

My invention is embodied in the mechanism illustrated in the accompanying drawings, which I will now proceed to describe in detail, afterward specifically pointing out my improvements in the appended claims.

This device is designed to be used in a harvesting-machine of any ordinary or suitable construction, and therefore such machine is not shown.

The frame A may be a separate frame; or it may be a part of the regular frame-work of the machine with which the device is to be used.

The frame B is fitted into the frame A, and is supported upon the swinging arms O P, which arms are pivoted at each end, as shown at *a'*. By this arrangement of the arms O P the strain does not come upon the pivots *a'*, as the weight rests directly upon the arms P, which are supported upon the frame A. This gives the frame B a strong support and an easy forward or back movement, which brings the device into a position for binding either long or short grain in the proper place. For the purpose of shifting the frame into the position desired, it is connected by a lever or other suitable device with a driver's seat; or the shifting may be placed under the control of an attendant riding on the machine.

The frame C C' is firmly attached to the frame B, and supports the bar or post E of the compressor, which is inclined inward, so as to bring the compressing devices partly over the grain which is being formed into gavels.

The wires or braces K K' are bent into the form shown in Figs. 1 and 2, and are firmly attached to the post E and cross-bar C'.

On the upper end of the post E is located a pulley or spool, L, upon which the compressing-cord M is wound. The pivot of this spool L may be an extension of the wire K'; or it may have a separate support, if desired. The spool L is provided with a fusee, N, upon which a short cord is wound, which connects the spool L with the upper end of the spring-bar J. This spring-bar J is coiled at one end to form the spring *z'*. Its end projects out and forms the arm *z*, as shown in Fig. 2, so that when the spring bar J is drawn down to its lowest point the arm *z* will be drawn up, so as to bring the treadle D to its highest point by means of the rod or link *y*.

The compressing-cord M, which is wound upon the spool L, is provided at its lower end with a knob, *j*, which in operation is caught under the catch *h* of the binder-arm H, and is held in that position while the arm H passes around the grain which is to form the gavel.

The operation of this part of the device is as follows: As the arm H rotates at its highest point the guide-spring *i* brings the knob *j* against the arm H and under the hook *h*, so that in its next round the cord M will be drawn from the spool L and passed around the gavel. In unwinding the cord M draws the cord of the spring J down upon the fusee N. The knob *j* is held in position until the projection *h* enters the depression of the cam-wheel *k*, when the catch or hook *h* releases the knob *j* and the spring-bar J winds the cord again on the spool L, which leaves the cord M ready to be caught by the next round of the arm H. The cord M is not released until after the twister has passed the curved bar *l*. This will complete the operation when the movement of the compression is continuous.

In order to impart an additional compression to the gavel when one of the notches *u* in the binder-arm H is engaged with the catches *v* on the upright spring-arm W, the attendant can draw down the binder-arm by pressing on the treadle D, the depression of the treadle through the medium of the spring-arm W, connected to said treadle, its catch $v$, and the notches $u$ in the binder-arm serving to impart a further compression to the gavel. By carrying bands in the receiver S the gavel can be bound by hand, which is desirable in case of accident to the binding mechanism, or in case the supply of binding-wire becomes exhausted.

For automatic binding the arm H is provided with a twisting-hook, $a$, operated by the pinion $b$, which is attached thereto, as shown. The pinion $b$ is provided with a dog or stop, $g$, which prevents it from rotating and letting the wire off from the hook $a$ while the arm H is passing around the gavel. The upper blade or section, $c$, of the shears or cutter passes over the opening made for the hook $a$ in the arm H, and is fastened firmly to the arm at its outer end. The moving arm or blade $d$ of the cutter is pivoted to the side of the arm H, as shown in Figs. 2, 3, and 4, the pivot extending through the socket and projecting below, so as to form the arm $f$, by which it is operated. The blade $d$ is returned to its open position by the spring $e$. The grain falls upon the platform or rack I, and, as the arm H passes around, the binding-wire $t$ is drawn through the guide-plate $p$ and carried around the gavel until the pinion $b$ reaches the rack $m$, when the hook $a$ commences to rotate and the other portion of the wire $t$ is caught between the guide-wheels $r$ and $s$, and the two wires are twisted together as the arm H advances with the pinion $b$ in contact with the rack $m$. When the wires are twisted sufficiently the arm $f$ comes in contact with the pin or projection $n$, and by means of the blades $c$ $d$ severs the wire, when the bound bundle is released and discharged from the machine. As the pinion $b$ strikes the rack $m$ the dog or stop $g$ is released from its contact with the pinion $b$ by means of the rib $o$ on the back of the curved plate $l$, so as not to interfere with the operation of the pinion $b$ and twisting-hook $a$.

The binding-wire spool is located at any suitable position on the machine, so that the wire can pass through the tension device $q$, and from that to the guide-plate $p$ and between the guide-rollers $r$ $r$.

In order to bring the wire $t$ within reach of the twisting-hook $a$, the lower end of the guide-plate $p$ is provided with a hook or curved section, $s'$, which will prevent the binding-wire from getting on the wrong side and bring it to the back or rear of wheel $s$, so that the twisting-hook $a$, as it passes between the guide-wheels $r$ $r$ and the wheel $s$, will grasp the wire $t$ and twist it. The cutter $c$ $d$, when it severs the binding-wire, leaves the end of it twisted around the hook $a$, so as to hold and bring it around the bundle at each successive operation.

In order to prevent the unbound grain from adhering to the bundle, the arm H is provided with a curved extension, H', which, as it passes through the rack or platform I, detaches the grain which has not been grasped by the arm H, and holds it back until the twisting and releasing of the bundle have been completed, when by the circular movement of the arm it passes out of the way and allows the grain which it held back to fall within the grasp of the arm H, ready for the next gavel. In thus dividing the grain some portion of it, if the grain is very ripe, is liable to be shelled, and in order not to lose this there is placed beneath the platform or rack I a grain-box, B', which is provided with sides B'', sufficiently high to hold the grain.

In addition to supporting an attendant the pins R R furnish a means which enables him to adjust the binding and compressing mechanism in the direction of the length of the grain by throwing his weight upon either of the pins, as desired. This will be accomplished by his act of adjusting himself to the best position for applying the band to the gavel, as by so doing he will carry the binding and compressing devices to such a position that the arm H, cord M, and bars K will compress the gavel at or near its middle.

What I claim as new, and desire to secure by Letters Patent, is as follows:

1. In a grain-binder, the combination, with the main frame A, of the binder-frame B, supported at its base, and the arms O O, pivoted to the upper portion of the binder-frame and to the main frame, substantially as described.

2. In a grain-binder, the combination, with the main frame A and the binder-frame, connected at their upper portions, of the arms P P, pivoted to the base of the binder-frame and to the lower portion of the main frame, substantially as described.

3. The swinging arms O P, in combination with the frames A B of a grain-binder, substantially as described.

4. The dog or latch $g$, in combination with the pinion $b$ for holding the hook $a$, so as to prevent the release of the binding-wire, substantially as specified.

5. The combination of the blade $c$ with the blade $d$, arm $f$, and stop $n$, substantially as and for the purpose specified.

6. The combination of the arm H, twisting-hook $a$, pinion $b$, dog $g$, and cutter $c$ $d$ with the wire-guide $p$, rack $m$, projection $o$, and stop $n$, substantially as and for the purposes specified.

7. The roller or wheel $q$, guide-plate $p$, overhanging the arm H, guide-wheels $r$ $r$, and wheel $s$ for keeping the wire in position, in combination with the revolving arm H, substantially as specified.

8. The combination of the cord M, spool L, and spring J with the spring-catch $h$, guide $i$, and knob $j$, substantially as described.

9. The hook or spring-catch $h$, in combination with the projection h' and cam-wheel k for releasing the cord M, substantially as described.

10. The notches u, in combination with the catch v, spring-arm w, and treadle D for giving the gavel an additional compression, substantially as specified.

11. The supporting-pins R R, in combination with the frame B and foot-board T for enabling an attendant to adjust said frame and the mechanism thereon in the direction of the length of the grain, substantially as specified.

JOHN F. STEWARD.

Witnesses:
JOHN F. HOLLISTER,
FRANK LULL.